United States Patent [19]
Wilson

[11] 3,916,328
[45] Oct. 28, 1975

[54] ZERO CROSSOVER DETECTOR WITH VARIABLE HYSTERESIS

[75] Inventor: Michael A. Wilson, Sarasota, Fla.

[73] Assignee: Electro Corporation, Sarasota, Fla.

[22] Filed: Aug. 19, 1974

[21] Appl. No.: 498,876

[52] U.S. Cl. ............................. 328/150; 307/235 E
[51] Int. Cl.² ........................................ H03K 5/20
[58] Field of Search ............ 307/235 R, 235 E, 291; 328/150

[56] References Cited
UNITED STATES PATENTS

| | | | |
|---|---|---|---|
| 3,281,608 | 10/1966 | Doyle | 307/235 |
| 3,727,079 | 4/1973 | Garrett | 328/150 X |
| 3,768,024 | 10/1973 | Letosky | 328/150 |

Primary Examiner—John S. Heyman
Attorney, Agent, or Firm—Wegner, Stellman, McCord, Wiles & Wood

[57] ABSTRACT

A zero crossover detector having a switching circuit for developing a digital output signal with transitions therein corresponding to, and occurring simultaneously with, the zero crossover points of an input AC signal, is provided with a control circuit for establishing a substantial zero hysteresis voltage level or switching level for the switching circuit immediately prior to each zero crossover of the input signal to eliminate phase delay in the output signal which would otherwise occur and for establishing a nonzero hysteresis level for the amplifier immediately after the output transition to maximize noise immunity.

19 Claims, 4 Drawing Figures o REFERENCE VOLTAGE
+ POSITIVE VOLTAGE
− NEGATIVE VOLTAGE
C CONDUCTING
N NONCONDUCTING

| Vo | Vd | D1 | D2 | D3 | D4 | D5 | D6 | Vh |
|----|----|----|----|----|----|----|----|----|
| +  | +  | C  | N  | N  | C  | N  | C  | +  |
| +  | +  | N  | N  | N  | C  | C  | N  | o  |
| −  | +  | N  | N  | C  | N  | N  | C  | o  |
| −  | −  | N  | C  | C  | N  | C  | N  | −  |

ZERO CROSSOVER DETECTOR WITH VARIABLE HYSTERESIS

BACKGROUND OF THE INVENTION

This invention relates generally to zero crossover detectors, and, in particular, to such detectors designed to have minimum hysteresis and maximum noise immunity.

For numerous reasons, it is often desirable to detect the reversals in polarity or zero crossover points of an analog or nondigital alternating signal. For example, magnetic sensor circuits are known that are provided with coils having alternating analog signals induced therein in response to the periodic passage in proximity to the sensor of ferromagnetic elements. Such circuits are shown in U.S. Pat. Nos. 3,701,015, 3,794,855 and 3,721,968, all assigned to the assignee of the present application. A zero crossover point of the alternating signal induced in the coil may be developed as each element passes the magnetic proximity sensor. The speed of the periodically moving elements may be determined by measuring the frequency of the induced alternating signal, and the positional phase of the elements relative to other moving elements being monitored may be determined by comparing the time of the zero crossover points of the alternating signal to those of a signal corresponding to such other moving elements.

It is often desirable to perform such speed or frequency and positional phase measurements by digital circuitry, in which case the analog alternating signals must first be converted into corresponding alternating digital signals having transitions from one state to another corresponding to the reversals in polarity or zero crossover points of the alternating analog input signals.

Accuracy of positional phase measurement is maximized when the output digital signal is in phase with the analog input signal, i.e., the transitions of the digital signal occur at substantially the same moment in time as the corresponding zero crossover points of the alternating analog input signal. A detection circuit which has a characteristic of producing an output signal in phase with the input signal is said to lack hysteresis or have zero hysteresis. In actuality, all switching circuits have an inherent minimal hysteresis because they are inherently insensitive to input signals that are less than a minimal switching signal level. However, the effects of such inherent hysteresis can in most applications be disregarded, and for purposes of discussion herein, will be considered as zero hysteresis.

But for the existence of electrical noise, a switching circuit having zero hysteresis, i.e., an effective zero input signal switching level, would characterize the ideal in a zero crossover detector. In almost all applications of zero crossover detectors, a minimal amount of input signal noise cannot be avoided. The sensitivity to input signal noise of a switching circuit used as a zero crossover detector is at its maximum immediately before and after the zero crossover point, for during these periods the input signal level and thus the signal-to-noise ratio is at its minimum. Specifically, in order for a noise spike on the input signal to effect the output of the switching circuit, it must have a polarity opposite to that of the input signal and a magnitude greater than the sum of the instantaneous magnitude of the input signal and the input signal switching level, hereinafter sometimes referred to as the hysteresis signal level.

Because of this inherent noise problem, switching circuits having zero hysteresis cannot be used as zero crossover detectors in many applications. To prevent false transitions in the output due to input noise, it has been necessary to design such switching circuits with a hysteresis voltage level in excess of the expected noise levels. A switching circuit provided with positive feedback to establish this hysteresis is shown in the aforementioned U.S. Pat. No. 3,701,015. However, as noted above, a switching circuit having hysteresis produces an output which is delayed in phase with respect to the input signal. Because a switching circuit having hysteresis switches at a time when the input signal exceeds the hysteresis voltage level, the phase delay of the output signal undesirably varies with variations in input signal amplitude.

Heretofore, designers of zero crossover detectors, in facing the above dilemma, have been forced to balance the noise immunity advantages of hysteresis against the phase delay variation disadvantages of hysteresis. The optimum level in hysteresis in such circuits had of course been dependent upon the particular intended use, considering such factors as input signal regulation, input signal strength, noise signal strength, frequency of operation, and the extent that accuracy is needed in the output signal. Accordingly, instead of being capable of providing a single zero crossover detector of universal application, it has often been necessary to design separate detectors for each intended use.

SUMMARY OF THE INVENTION

The principal object of the present invention is to provide a zero crossover detector of the type described above having both the accuracy of one with zero hysteresis and the noise immunity of one with nonzero hysteresis. This unique presence of the advantages of both characteristics in the zero crossover detector of the present invention is provided by selectively altering the effective hysteresis of a switching circuit producing the detection output signal during different portions of each half wave of the alternating analog input signal applied thereto.

Briefly, circuitry responsive to the input signal and connected with a detection switching circuit, which functions to produce the output signal of the zero crossover detector, operates to establish a substantially zero hysteresis for the detection switching circuit immediately prior to each zero crossover point of the input signal and to establish a substantially nonzero hysteresis for the detection switching circuit immediately after each zero crossover point of the input signal. In this manner, the zero crossover detector is provided with a minimum level of noise insensitivity immediately after a zero crossover point when most needed because the signal-to-noise ratio is at its minimum, and with a substantially zero phase delay between the digital output signal and the analog input signal, thereby eliminating phase displacement variation problems associated therewith.

The hysteresis of the detection switching circuit is dependent upon the effective value of a hysteresis control signal applied to input signal receiving means thereof. The various values of this hysteresis control signal are developed in accordance with the respective states of the output signal of the detection switching circuit and a second alternating digital signal delayed in phase with respect to the input signal. In a preferred embodiment, a gating circuit comprising a diode network is controlled in accordance with the output signal and the phase delayed signal to develop the hysteresis control signal. In another embodiment, the hysteresis control signal is developed by summing together the detection switching circuit output signal and the phase delayed signal.

The phase delayed signal is developed in response to the input signal by a second switching circuit which has a nonzero hysteresis and is thus relatively immune to noise. Because of this, a noise spike of lesser magnitude than the hysteresis voltage of the second switching circuit occurring during the period when the detection switching circuit has a zero hysteresis will not cause multiple transitions in the output signal of the detection switching circuit.

BRIEF DESCRIPTION OF THE DRAWINGS

The above features and advantages of the zero crossover detector of the present invention will be made more apparent, and other features and advantages will be disclosed in the following description of the preferred embodiment, taken in conjunction with the following drawings, in which.

DESCRIPTION OF THE PREFERRED EMBODIMENTS

Figures 1, 2:
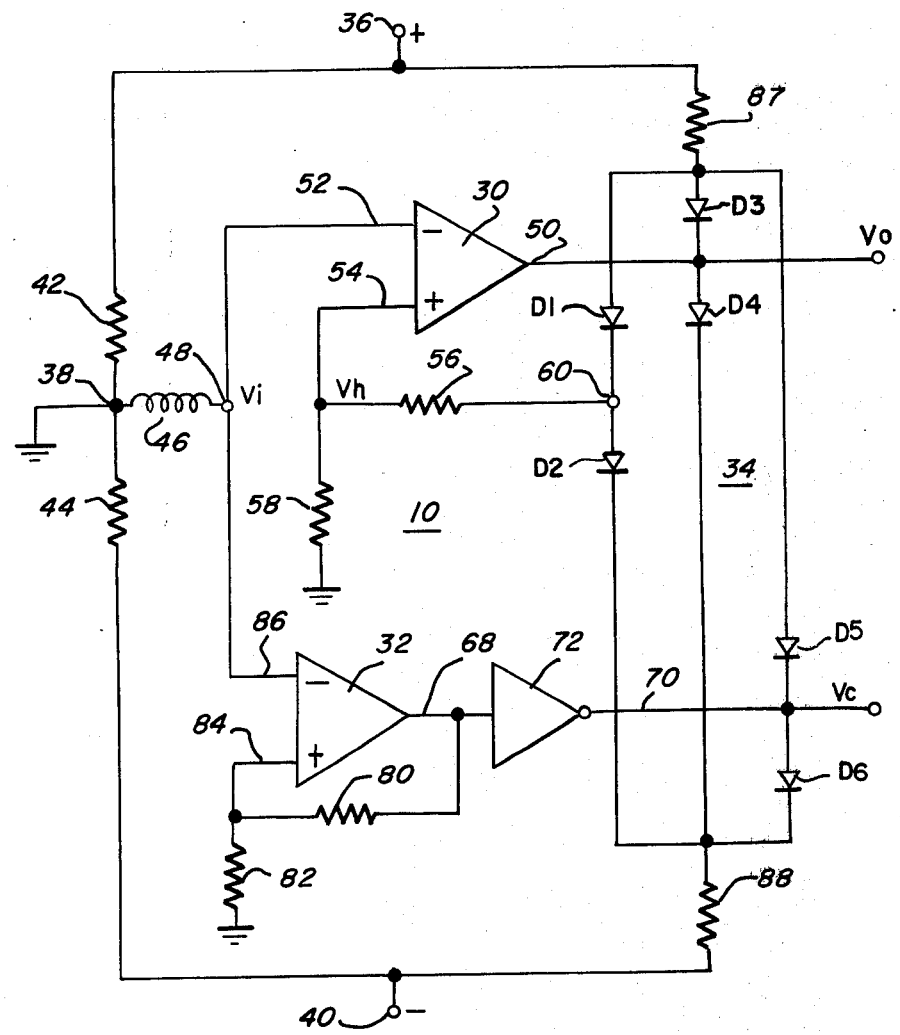
FIG. 1 is a circuit schematic of a preferred embodiment of the zero crossover detector of the present invention.
FIG. 2 is a chart showing the states of conduction of various diodes of a digital gating circuit used in the circuit of FIG. 1 corresponding to the respective values of the hysteresis control signal, the second alternating digital signal, and the detection switching circuit output signal.

The preferred embodiment of the zero crossover detector of the present invention, as shown in FIG. 1, and generally designated by reference numeral 10, is designed to have the desirable noise immunity characteristics of a zero crossover detector with zero hysteresis, but still produce an output signal having the desirable in-phase phase relationship with the input signal. This dual capability is achieved by selectively varying the hysteresis of a detection switching circuit 30 which produces the detector output signal Vo corresponding to the input signal Vi, as shown in FIG. 3.

Figure 3:
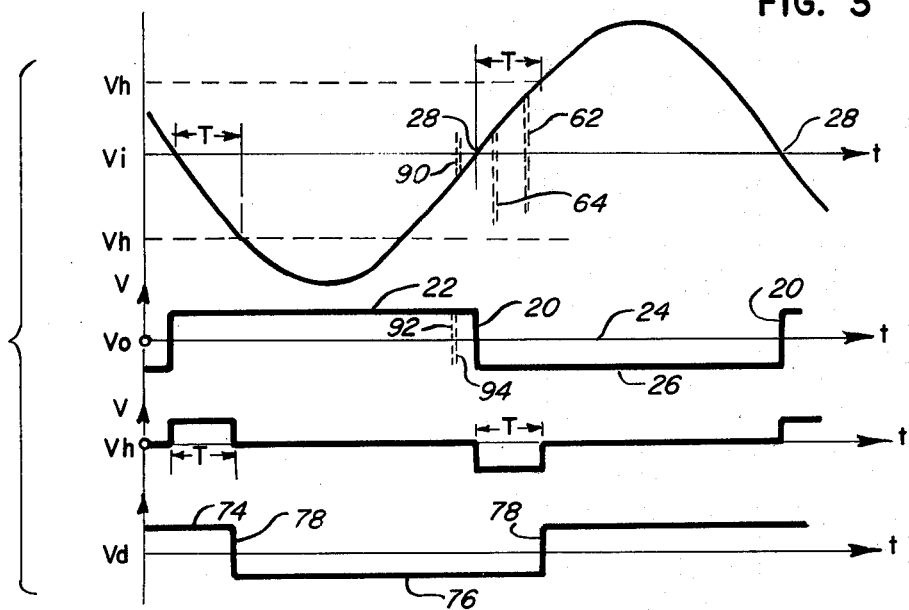
FIG. 3 is a comparative timing diagram of a typical input signal wave form and the various signal wave forms developed in response thereby by the preferred embodiments of the detector shown in FIG. 1 and FIG. 4.

Briefly, the hysteresis of detection switching circuit 30 is dependent upon the value of a hysteresis control signal Vh applied thereto, an exemplary wave form of which is shown in FIG. 3. This signal is developed by a hysteresis control circuit including a second switching circuit 32 which develops a second alternating digital signal Vd, an exemplary wave form of which is shown in FIG. 3, that is delayed in phase with respect to the input signal Vi and thus output signal Vo, and a digital gating circuit, generally designated by reference numeral 34, including a plurality of diodes D1, D2, D3, D4, D5 and D6. Digital gating circuit 34 produces the hysteresis control signal Vh in response to both the output signal Vo of the detection switching circuit 30 and the phase delayed signal Vd developed by the circuit including second switching circuit 32.

In addition to the above operational elements of zero crossover detector 10, power and a source of hysteresis establishing signal is provided by a DC power supply having a terminal 36 positive in polarity with respect to a reference potential point 38, which may be at ground reference potential, and a power supply terminal 40 negative in polarity with respect to reference potential point 42. A pair of resistors 42 and 44 connected in series between positive power supply terminal 36 and a negative power supply terminal 40 have their common junction connected with the point of reference potential 38 to establish the potential value of the power supply terminals. Preferably, the value of resistor 42 equals that of resistor 44 such that the magnitude of the power supply voltage at positive terminal 36 is equal to that at power supply terminal 40.

The operation of the detector is not dependent upon the particular source of input signal Vi, but as shown in FIG. 1, input signal Vi may be provided by a coil 46 of a magnetic proximity sensor, or the like, having one end thereof connected to reference potential point 38 and the other end thereof connected to an input terminal 48 of the detector. Periodic variations in the flux through a coil, such as coil 46, may result in an input signal of the type shown in FIG. 3.

While detection switching circuit 30 may comprise any type of switching circuit in which the hysteresis thereof can be controlled in accordance with a hysteresis control signal, it preferably comprises an amplifier of the differential type, having an output 50 on which the output signal Vo of the zero crossover detector 10 is produced, and an input signal receiving means comprising an inverting input 52 and a non-inverting input 54. As suggested by the designations given to these two inputs, signals applied to inverting input 52 have an inverse effect on the output of detection switching circuit 30, while signals applied to noninverting input 54 do not. As shown in FIG. 1, the input signal Vi is applied through input terminal 48 to inverting input 52, and the hysteresis control signal Vh is applied to noninverting input 54.

Hysteresis control signal Vh is developed at the junction between a pair of series resistors 56 and 58 connected between an output terminal 60 of gating circuit 34 and ground reference potential. Resistors 56 and 58 function as a voltage divider, and thus the hysteresis control signal applied to noninverting input 54 is directly proportional to the signal developed at output terminal 60, and the two signals may be considered to be the same insofar as operation of the detection circuit is concerned.

As seen in FIG. 3, since the input signal Vi is applied to inverting input 52 of detection switching circuit 30, the output signal Vo is actually out of phase by 180° with respect to the input signal. However, since the only parts of the output signal which are significant are the transitions 20, a signal which is 180° out of phase may be treated as equivalent to one which is in phase. Needless to say, the output signal could readily be inverted. In either event, to minimize phase error, the hysteresis control signal Vh assumes a substantially zero value immediately prior to a zero crossover point, as shown in FIG. 3, and consequently, detection switching circuit 30 produces an output transition 20 simultaneously with each reversal in polarity of the input signal.

Immediately after an output transition 20, and for a short time period thereafter, the length of which may vary with the magnitude of the input signal Vi, the hysteresis control signal assumes a nonzero value. Following a positive going output transition 20, the hysteresis control voltage assumes a nonzero value with a positive polarity and immediately following a negative output transition 20, the hysteresis control voltage Vh assumes a nonzero value with a negative polarity. During the time period T, immediately following an input signal crossover point 28, when the detection switching circuit 30 has a nonzero hysteresis, it is insensitive to reverse polarity input noise which does not exceed a magnitude greater than the total of the hysteresis voltage Vh plus the instantaneous input signal magnitude, such as illustrative noise spike 62 shown in FIG. 3. A noise spike, such as illustrative noise spike 64, that has a magnitude exceeding the sum of the hysteresis signal and the input magnitude would have to be applied to the input signal before a false output transition 20 would result. The noise sensitivity level is of course equal to the magnitude of the hysteresis signal at the zero crossover point when the instantaneous input signal magnitude is zero and increases with increases in the input signal magnitude. Thus, at the end of time period T, when the instantaneous amplitude is in excess of the magnitude of the hysteresis control signal during the time period T, the hysteresis control voltage may be removed or reduced to zero.

As earlier indicated, the hysteresis control signal is provided by a digital gating circuit 34 in response to a phase delayed signal Vd produced by a circuit including a second switching circuit 32 and a detector output signal produced by detection switching circuit 30. The second switching circuit 32 produces a signal on its output 68 that is 180° out of phase with the phase delayed signal Vd shown in FIG. 3. The signal produced on output 68 is inverted by inverter 72 to produce phase delayed signal Vd on the output 70 of the inverter. As seen in FIG. 3, the phase delayed signal Vd, like the detector output signal Vo, alternates between positive state 74 and negative state 76, and has transitions 78 therebetween corresponding to the zero crossover points 28 of the input signal Vi. However, unlike the output signal Vo, the phase delayed signal Vd is delayed in phase with respect to the input signal Vi. In particular, transitions 78 of phase delayed signal Vd occur a time period T after the occurrence of the corresponding zero crossover points 28.

This phase delay is due to the fact that second switching circuit 32 has a fixed hysteresis. The second switching circuit 32 comprises a differential amplifier like the detection switching circuit 30, and its hysteresis is established by a pair of resistors 80 and 82 which provide positive feedback from the signal on its output 68 to its noninverting input 84. Resistors 80 and 82 function as a voltage divider to establish the magnitude of the feedback signal. The input signal Vi is connected to the inverting input 86 of the second switching circuit 32, and, accordingly, the output signal is inverted. The phase delay results because the output transitions 78 corresponding to zero crossover points 28 do not occur until the amplitude of the input signal Vi applied to inverting input 86 exceeds the hysteresis voltage established at noninverting input 84.

The gating circuit 34 generates the hysteresis control voltage Vh by selectively applying to output 60 of the gating circuit 34 positive polarity voltage signals, negative polarity voltage signals, or null signals in accordance with the respective digital states of the phase delayed signal Vd and the output signal Vo. Positive polarity power and reference potential is supplied to gating circuit 34 from positive power supply terminal 36 through a resistor 87, and negative polarity power and bias potential is supplied from negative power supply terminal 40 through a resistor 88. Referring to the table of FIG. 2 and the comparative wave forms of FIG. 3, it is seen that the value and polarity of the hysteresis control signal Vh is dependent upon the respective polarity states of the output signal Vo and the phase delayed signal Vd. In particular, referring to FIG. 2, it is seen that when the output signal Vo and the phase delayed signal Vd have nonzero magnitudes, positive with respect to the reference potential, the hysteresis control signal Vh assumes a positive polarity with respect to the reference potential. Likewise, when both the output signal Vo and the phase delayed signal Vd have negative polarities, the hysteresis control signal likewise assumes a negative polarity value. Finally, when the output signal Vo and the phase delayed signal Vd are of opposite polarities, one being positive and the other being negative, the hysteresis control signal has a zero or reference potential value. Summarizing, the hysteresis control signal Vh has a zero magnitude when the output signal Vo and phase delayed signal Vd are of opposite polarity, and has a nonzero magnitude of the same polarity as the output signal and the phase delayed signal whenever those two signals have the same polarity.

Referring to the table of FIG. 2, it is seen that the various states of the hysteresis control signal are developed by selectively biasing the various diodes D1, D2, D3, D4, D5 and D6 into conduction or nonconduction. For instance, when both the output signal Vo and the phase delayed signal Vd are in their first or positive polarity state, diode D1, having its anode connected to resistor 87 and its cathode connected to output terminal 60, is biased into conduction such that the positive power supply potential at terminal 36 is coupled through resistor 87 and diode D1 and thereby appears at output terminal 60. At this same time, diode D4, having its anode connected to the output 50 of detection switching circuit 30 and its cathode connected to resistor 88, is forward-biased to apply a positive bias potential to the cathode of D2, which is thereby rendered nonconductive. Diode D6, having its anode and cathode respectively coupled to the output 70 of inverter 72, like diode D4, is forward-biased and thereby rendered conductive. The conduction of diode D6 reverse-biases diode D5, having its anode and cathode respectively coupled to resistor 87 and output 70 of inverter 72, which is thereby rendered nonconductive as is diode D3 having its cathode and anode connected to resistor 87 and output 50 of detection switching circuit 30, respectively.

When the output signal Vo and phase delayed signal Vd are of opposite polarities, both diodes D1 and D2 are reverse-biased to produce a zero magnitude hysteresis control signal Vh. When the output signal Vo is positive and the phase delayed signal is negative, diode D1 is reverse-biased through a negative polarity signal applied to its anode through diode D5 from phase delayed signal Vd, and diode D2 is reverse-biased by a positive bias potential applied to its cathode from output signal Vo through diode D4. When the output signal Vo has a negative polarity and the phase delayed signal has a positive polarity, diodes D1 and D2 are likewise reverse-biased and rendered nonconductive. Diode D1 is turned off by a negative polarity potential from the output signal Vo applied to its anode through diode D3, and diode D2 is rendered nonconductive by reverse-bias positive potential applied to its cathode from phase delayed signal Vd through diode D6.

When both the output signal Vo and the phase delayed signal Vd have a negative polarity, diode D1 is rendered nonconductive and diode D2 is turned on to apply a negative polarity hysteresis control signal to output 60 from negative power supply terminal 40 through resistor 88. Diode D1 is reverse-biased by negative polarity potential from the output signal Vo and the phase delayed signal Vd is applied to its anode through forward-biased diodes D3 and D5. Diodes D4 and D6 are reverse-biased to permit diode D2 to enter into and maintain its conductive state.

Thus, it is seen that a hysteresis control signal Vh, as shown in FIG. 3, is produced to provide detection switching circuit 30 with a selected nonzero hysteresis immediately following a zero crossover point and a substantially zero hysteresis immediately preceding a zero crossover point. Because the detection switching circuit 30 does have a zero hysteresis immediately preceding a zero crossover point, it is sensitive to input noise such as illustrative noise spike 90 shown in FIG. 3. A noise spike during this period will cause a production of a single false transition in the output signal Vo. However, in a zero crossover circuit in which the switching circuit has a fixed zero hysteresis, such a spike would cause a multiple transition in the output signal Vo. One transition would occur when the noise spike passed through zero while increasing in magnitude, and another transition would occur when the noise spike passed through zero decreasing in magnitude. Another transition would then occur at the regular zero crossover point 28 of the input signal. False output transitions, designated 92 and 94, corresponding to noise spike 90, are illustrated in the wave form of output signal Vo of FIG. 3.

Such multiple transitions as 92 and 94 immediately followed by a true transition 20 are prevented in the zero crossover detector of the present invention. As soon as transition 92 occurs, the hysteresis of detection switching circuit 30 increases from its previous zero value to a selected nonzero value. Consequently, the second crossover point of a noise spike 90 will not result in a second transition 94. Thus, when the input signal has a zero crossover point 28, the output signal Vo will already be in the state to which it would otherwise be switched, and another output transition 20 is not developed. Thus, while the zero crossover detector may be sensitive to noise immediately preceding a zero crossover point, such noise signal, at worst, will only produce minor phase errors in the output signal and will not produce multiple transition frequency errors in the output signal. It should be appreciated that a noise spike, such as noise spike 90, can only result in a multiple transition in the output signal, such as transitions 92 and 94, if its magnitude exceeds the sum of the hysteresis voltage of the second switching circuit 32 and the amplitude of the input signal, for only then would a transition be produced in the phase delayed signal Vd resulting in a zero hysteresis control voltage.

Further, with regard to the second switching circuit 32, it should be appreciated that the phase delay of the phase delayed signal Vd with respect to the input signal Vi, and thus the time period T for which a nonzero hysteresis control signal is produced following an output transition, is dependent upon the fixed hysteresis voltage or switching input level of the second switching circuit 32. By increasing the hysteresis voltage applied to noninverting input 84 of the second switching circuit 32 to a value corresponding to the peak amplitude of the input signal Vi, the time period T could be increased to a time period corresponding to a quarter wave cycle of the input signal Vi. Thus, the time period may fluctuate with variations in the amplitude of the input signal Vi, and an optimum value for the hysteresis voltage for second switching circuit 32 may have to be selected accordingly.

Figure 4:
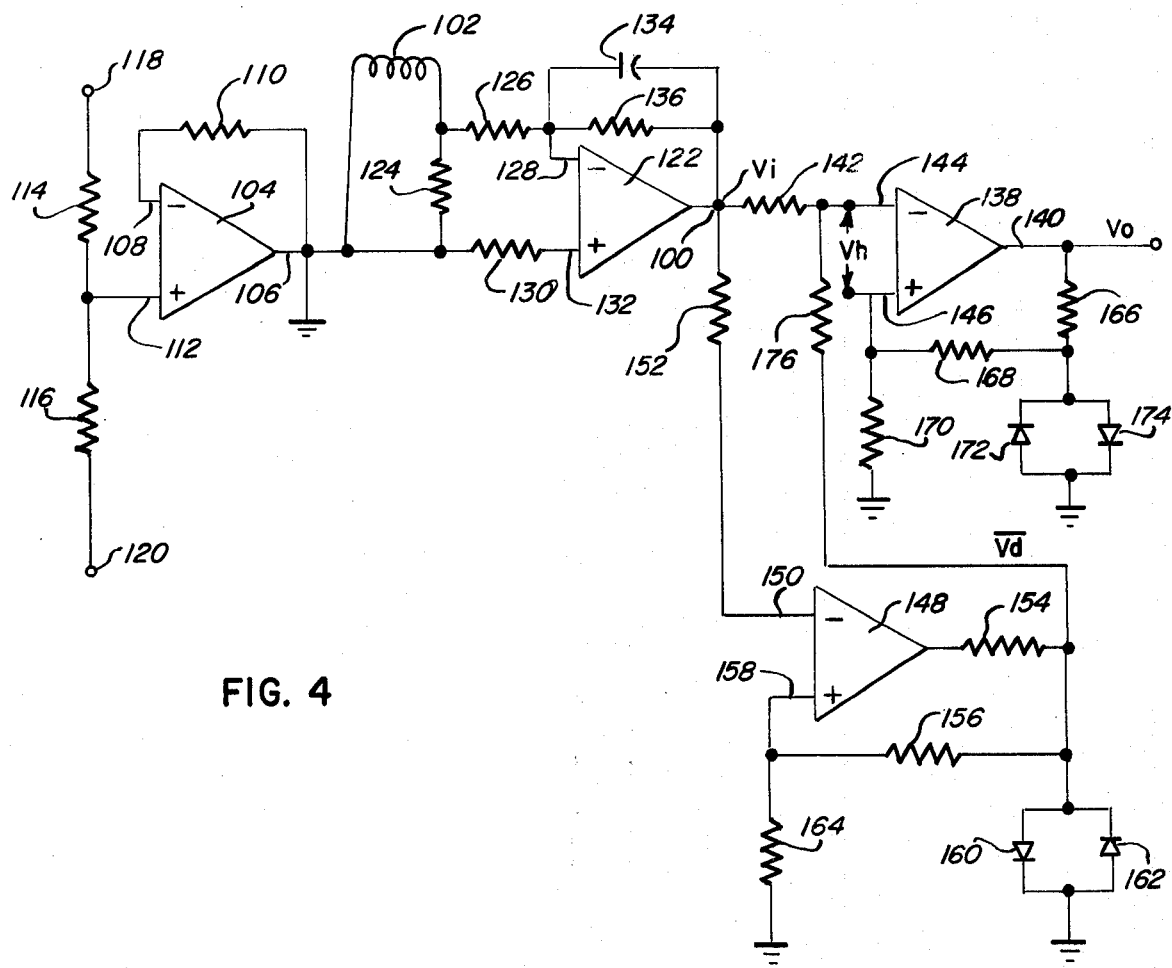
FIG. 4 is a circuit schematic of another embodiment of the zero crossover detector of the present invention.

Turning now to FIG. 4 of the drawings, another embodiment of the zero crossover detector of the present invention is shown in which the hysteresis control signal Vh is developed by an analog method instead of the digital technique used in the first embodiment shown in FIG. 1. Substantially the same signals produced by the zero crossover detector of FIG. 1 and illustrated in FIG. 3 are developed in the embodiment of the zero crossover detector shown in FIG. 4, and like reference may be made to FIG. 3 for illustrative wave forms of such signals.

As in the first embodiment of the zero crossover detector of the present invention, the input signal Vi produced at an input terminal 100 may be developed in response to the periodic variations in magnetic flux through a coil 102 of a magnetic proximity sensor. In such a case, an amplifier 104 having its output 106 connected to one side of coil 102 and ground, and having a negative feedback path from its output 106 to an inverting input 108, may be used to provide a low current drain, low impedance reference voltage at output 106 required to feed such a coil. Amplifier 104, in addition to having a feedback signal applied to its inverting input 108, also has a reference potential applied to its noninverting input 112 from the juncture between two series-connected resistors 114 and 116 connected between a positive terminal 118 and a negative terminal 120 of a DC power supply.

The signal produced by coil 102 may be amplified by another amplifier 122 to produce input signal Vi. The current produced in coil 102 develops a voltage signal across a resistor 124 in parallel therewith. This signal may be coupled to amplifier 122 by a resistor 126, connected between an inverting input 128 and one side of resistor 124, and a resistor 130, connected between a noninverting input 132 and the other side of resistor 124. Finally, with regard to the input signal developing circuit, amplifier 122 may be provided with a feedback circuit from its output, connected to input terminal 100 of the zero crossover detector, to its inverting input 128, comprising a capacitor 134 in parallel with a resistor 136. The amplification provided by amplifier 122 may be integrating or simple, but in either event, an input signal Vi, an illustrative wave form of which is shown in FIG. 3, is produced at input terminal 100.

As in the zero crossover detector of FIG. 1, the embodiment of FIG. 4 has an amplifier 138 which produces the output signal Vo on its output 140 in response to the input signal Vi. Input signal Vi is applied from input terminal 100 through a resistor 142 to an inverting input 144 of input receiving means thereof including a noninverting input 146. Also, a phase delayed signal Vd is developed by a second switching circuit 148 in response to the input signal Vi which is applied to an inverting input 150 through a resistor 152. The phase delayed signal produced by switching circuit 148, designated as $\overline{Vd}$ in the drawing, has a wave form which is the inverse of the signal $\overline{Vd}$ shown in FIG. 3. Signal Vd is produced at the junction between a resistor 154, connected to the output of second switching circuit 148, and a resistor 156, connected to a noninverting input 158 of the second switching circuit 148. The junction between resistors 154 and 156 is also connected to ground through a pair of diodes 160 and 162 connected in parallel, and poled in opposite directions, to limit the magnitude of the voltage swings at the junction to the cut-in voltages of the diodes. This limited voltage produced at the junction is proportionately reduced by the voltage divider action of resistor 156 and a resistor 164 connected between noninverting input 158 and ground. This positive feedback voltage applied to the noninverting input 158 provides second switching circuit 148 with a fixed hysteresis voltage such that phase delayed signal $\overline{Vd}$ is delayed in phase with respect to the input signal Vi.

The detection switching circuit 138 is also provided with a positive feedback signal from the output signal Vo to the noninverting input 146 through a feedback network including resistors 166, 168 and 170 and diodes 172 and 174. This feedback network functions in substantially the same way as the feedback network of second switching circuit 148 with resistors 166, 168 and 170 and diodes 172 and 174 corresponding to resistors 154, 156 and 164 and diodes 160 and 162, respectively.

Unlike the zero crossover detector embodiment shown in FIG. 1, in which the hysteresis control signal comprised a source of control signal selectively applied to the non-inverting input of the detection switching circuit in accordance with the respective states of the output signal Vo and the phase delayed signal Vd by a digital gating circuit, in the embodiment shown in FIG. 4, the hysteresis control signal Vh comprises a differential signal measured between the inverting input 144 and the noninverting input 146. The phase delayed signal developed by second switching circuit 148 is applied to noninverting input 144 through a resistor 176, and the hysteresis control signal Vh comprises the difference between this signal and the feedback signal from the detection switching circuit 138 itself. Essentially, the phase delayed signal and the feedback signal are summed at the input of the detection switching circuit to form the hysteresis control signal.

The values of various resistors used in the circuit may be selected such that the magnitude of the signal applied to inverting input 144 is equal to the feedback signal corresponding to output signal Vo, so that when the output signal Vo and the phase delayed signal $\overline{Vd}$ are of the same polarity, the hysteresis control signal Vh has a zero value and the detection switching circuit 138 has a zero hysteresis. As explained above, and as illustrated in the comparative wave form of FIG. 3 and the table of FIG. 2, this occurs prior to each zero crossover point of the input signal Vi. Immediately following each positive-going zero crossover point of the input signal, when the output signal Vo has a negative polarity and the phase delayed signal $\overline{Vd}$ has a positive polarity, the hysteresis control signal has a magnitude substantially proportional to twice the magnitude of each, and has a negative polarity. This is because the application of a positive polarity signal to the inverting input 144 has the same effect as the application of a negative polarity signal of equal magnitude applied to noninverting input 146, and vice versa. Likewise, when the output signal Vo has a positive polarity and the phase delayed signal $\overline{Vd}$ has a negative polarity, the hysteresis control signal Vh has a positive polarity and a magnitude equal to twice the magnitude of the feedback signal applied to the noninverting input 146.

I claim:

1. In a zero crossover detector having a detection switching circuit for developing a digital detection output signal with transitions between first and second states thereof corresponding to zero crossover points of an input signal applied thereto, a circuit to control the hysteresis of the detection switching circuit, comprising:

means responsive to the input signal for developing a hysteresis control signal assuming a value after each zero crossover point to establish a nonzero hysteresis for the detection switching circuit, and assuming another value before each zero crossover point to establish a hysteresis for said detection switching circuit less than said nonzero hysteresis; and means for applying said hysteresis control signal to the detection switching circuit for controlling the hysteresis thereof.

2. The hysteresis control circuit of claim 1 in which the other value of the hysteresis established for the detection switching circuit is substantially zero whereby the detection output signal developed by the detection switching circuit is substantially in phase with the input signal.

3. The hysteresis control circuit of claim 1, in which the hysteresis control signal developing means includes means responsive to both the detection output signal and the input signal.

4. The hysteresis control circuit of claim 3, in which said hysteresis control signal developing means includes means for developing a digital signal alternating between first and second states, delayed in phase with respect to the input signal and means responsive to both the phase delayed signal and the detection output signal for developing said hysteresis control signal.

5. The hysteresis control circuit of claim 4, in which said phase delayed signal developing means includes a second switching circuit having a fixed nonzero hysteresis voltage, said second switching circuit developing a digital output signal in response to the input signal corresponding to the phase delayed signal, said output signal of the second switching circuit having a transition between first and second states thereof each time the magnitude of the input signal applied thereto exceeds the hysteresis voltage of the second switching circuit.

6. The hysteresis control circuit of claim 5, wherein the phase delayed signal developing means includes means for applying a positive feedback signal from the output of the second switching circuit to the input of the second switching circuit to establish said fixed nonzero hysteresis voltage therefor.

7. The hysteresis control circuit of claim 6, in which said phase delayed signal developing means includes means for inverting the output of the second switching circuit.

8. The hysteresis control circuit of claim 6, in which said second switching circuit comprises an amplifier having an inverting input coupled with the input signal receiving means of the detection circuit, a noninverting input, and an output, and said feedback signal applying means includes means connected between the output of the second switching circuit and the noninverting input.

9. The hysteresis control circuit of claim 4, in which the hysteresis control signal assumes said nonzero hysteresis establishing value in response to each change in state of the digital detection output signal and assumes said values in response to each change in state of the phase delayed signal.

10. The hysteresis control circuit of claim 9, in which said phase delayed signal developing means comprises a second switching circuit responsive to said input signal to develop the phase delayed signal and includes means for establishing a hysteresis therefor greater than that of the detection switching circuit before each zero crossover point of the input signal.

11. The hysteresis control circuit of claim 4, in which said hysteresis control signal has a polarity opposite that of the input signal upon assuming said nonzero hysteresis establishing value.

12. The hysteresis control circuit of claim 4, in which said hysteresis control signal developing means includes means for providing a signal of said nonzero hysteresis establishing value, and means for selectively applying it to the detection switching circuit in accordance with respective states of the detection output signal and the phase delayed signal.

13. The hysteresis control circuit of claim 12, in which said selective signal applying means includes a digital gating circuit connected between the signal providing means and the detection switching circuit, said gating circuit gating said signal from the signal providing means to the detection switching circuit in response to the detection output signal and the phase delayed signal simultaneously assuming selected states of each.

14. The hysteresis control circuit of claim 12, in which the gating circuit gates said signal to the detection switching circuit when the output signal is in one of its first and second states and the phase delayed signal is in one of its first and second states corresponding thereto, and when the output signal is in the other of its first and second states and the phase delayed signal is in the other of its first and second states corresponding thereto.

15. The hysteresis control circuit of claim 14, in which the state of the phase delayed signal corresponds to the detection output signal when they are both of the same polarity.

16. The hysteresis control circuit of claim 12, in which the digital gating circuit includes first unidirectional conducting means rendered conductive when forward-biased and nonconductive when reverse-biased and connected between the signal providing means and the detection switching circuit, and means for selectively reverse-biasing the unidirectional conducting means in response to the respective states of the detection output signal and the phase delayed signal.

17. The hysteresis control circuit of claim 16, in which said reverse-biasing means includes other unidirectional conducting means connected between the first unidirectional conducting means and the output of the detection switching circuit and the second switching circuit.

18. The hysteresis control circuit of claim 12, in which the hysteresis control signal is developed at an output terminal of the gating circuitry and in which said signal providing means comprises a DC power supply having a terminal with a positive polarity with respect to a reference potential and another terminal with a polarity negative with respect to the reference potential, and in which said gating means includes a plurality of diodes each having a cathode and an anode, a first one of said diodes having its anode connected to the positive polarity terminal and its cathode connected to the gating circuitry output terminal, a second diode having its cathode connected to the negative polarity terminal and its anode connected to the gating circuitry output terminal and others of said plurality of diodes connected with said first and second diodes, said positive polarity terminal, said negative polarity terminal, responsive to the detection output signal and the phase delayed signal to alternately forward-bias the first and second diodes after alternate zero crossover points, respectively, and to reverse-bias both said first diode and said second diode prior to each crossover point.

19. The hysteresis control circuit of claim 18, in which said other diodes of said plurality of diodes include a third diode having its anode connected to the positive polarity terminal and its cathode connected to the output of the detection switching circuit, a fourth diode having its anode connected to the output of the detection switching circuit and its cathode connected to the negative polarity terminal, a fifth diode having its anode connected to the positive polarity terminal and its cathode connected to the output of the phase delayed signal developing means, and a sixth diode having its anode connected to the output of the phase delayed signal developing means and its cathode connected to the negative polarity terminal.

* * * * *